G. C. MARTIN.
SHOCK ABSORBER.
APPLICATION FILED JAN. 24, 1912.
1,137,997.
Patented May 4, 1915.
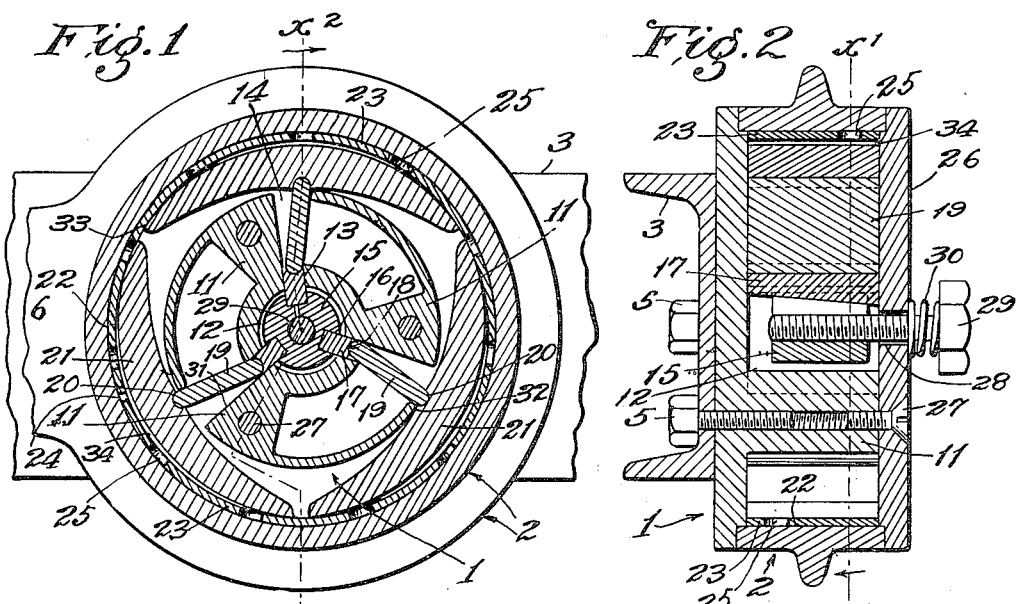
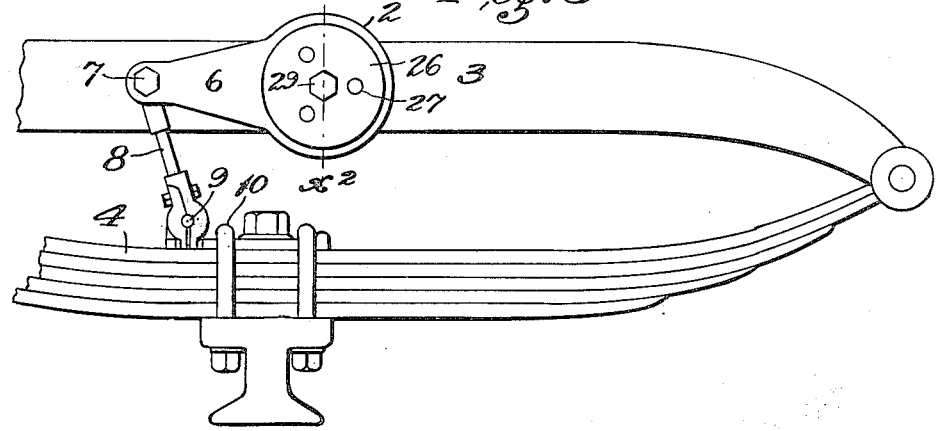
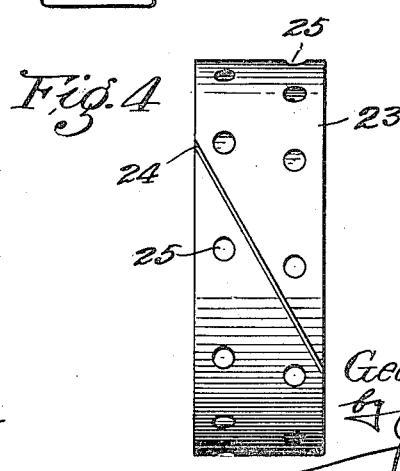
Witnesses
C. C. Holly
L. Belle Rice
Inventor
George Cushing Martin
by James R. Townsend
his atty

UNITED STATES PATENT OFFICE.

GEORGE CUSHING MARTIN, OF LOS ANGELES, CALIFORNIA.

SHOCK-ABSORBER.

1,137,997.     Specification of Letters Patent.     Patented May 4, 1915.

Application filed January 24, 1912. Serial No. 673,226.

*To all whom it may concern:*

Be it known that I, GEORGE CUSHING MARTIN, a citizen of the United States, residing at Los Angeles, in the county of Los Angeles and State of California, have invented new and useful Improvements in Shock-Absorbers, of which the following is a specification.

This invention relates to that class of shock absorbers shown in Letters Patent of the United States, No. 993536, patented to me May 30, 1911 and also to shock absorbers of the character illustrated in Letters Patent of the United States No. 1,039,305 granted to me September 24, 1912, and which is provided with two relatively rotatable elements, one of which is a circular wall; a shoe to engage said circular wall, said shoe being normally unconformed to the wall; floating means between said shoe and the second element to force the shoes against the wall upon relative rotation in one direction and to release the shoe upon relative rotation in the other direction; and resilient means to hold said floating means in operative position.

An object of this invention is to increase the period of practical use and to distribute the wear equally throughout the frictional wearing surface so that the operative life of the shock absorber will be indefinitely prolonged.

Another object is to make provision whereby too sudden clutching action is avoided and whereby perfect ease of action in absorbing shocks is insured.

Another object is to simplify and cheapen the construction of the shock absorber.

Another object is to avoid the necessity of extreme accuracy in constructing the brake shoes and to thereby reduce the cost of manufacture.

In this invention I have provided a floating frictional expansible surface for the stationary circular wall in order to avoid uneven wear and insure practically uniform gripping action.

The accompanying drawings illustrate the invention.

Figure 1 is a sectional view on line $x^1-x^1$, Fig. 2, of a shock absorber constructed in accordance with this invention. Fig. 2 is a sectional view of the shock absorber on irregular line $x^2-x^2$, shown in Fig. 1 and partly indicated in Fig. 3. Fig. 3 is a side elevation of the shock absorber applied for use. Fig. 4 is an elevation of the floating yielding band.

Two relatively rotatable elements 1, 2 are, as in the former application, connected to two relatively movable parts 3, 4 of the vehicle through practical means as the cap screw 5 securing the part 1 to the chassis 3; and the arm 6, pin 7 connecting rod 8, pin 9 and clip 10 that connect the element 2 with the spring 4.

The element 1 comprises a plate having blocks or posts 11 projecting from one side and providing an axial cylindrical chamber 12 and radial ways therefrom having inner parallel sided portions 13 and outer outwardly widened portions 14; the cylindrical chamber 12 being adapted to accommodate a floating axially movable wedge block 15 that is free to move laterally as well as axially and is provided with recesses 16 registering with, and of the same width as the inner radial ways 13; there being wedges 17 adjustable in the ways 16 and 13; said wedges having concave grooves 18 on their outer faces to articulate with the outer edges of floating toggle bars 19, which are round to articulate with notches 20 in resilient segmental brake shoes 21 that are normally unconformed in their outer contour to the frictional surface with which they are to engage.

Inside the circular wall 22 of the ring-like element 2, is a lining formed as a yielding floating expansible friction-band or wearring 23 arranged encircling the segmental shoes 21. Said floating friction-band is preferably a circular wrought iron band of uniform thickness throughout its circumference, open on one side by means of a spiral or diagonal cleft 24 so that the band is capable of being expanded by the pressure of the shoes to frictionally engage the inner face of wall 22 and produce greater or less resistance against rotation as the shoes are made to lightly or forcibly engage the band. Said band is preferably provided with perforations 25 arranged in staggered relation to each other to admit oil freely from the interior chamber in which the shoes and their operative parts are mounted.

A cap 26 is fastened by screws 27 to the posts 11 and is provided with a central perforation 28, through which an adjusting screw 29 loosely extends to engage the floating wedge block 15; a stiff spiral take-up spring 30 being provided between the cap 26 and the head of the adjusting screw 29 to take up the wear if any, so that when the wedge block 15 is adjusted to hold the segmental shoes 21 in determined relation to the ring 23 and circular wall 22, such relation will be constantly maintained though wear may occur.

The circular wall 22 and the segmental shoes 21 are made very hard so as to resist wear; and the floating band 23 is made of relatively softer material so that any wear that occurs will only affect the ring. The segmental shoes are preferably unconformed to the floating band so that portions of the shoes are externally unsupported, and the toggle bars are arranged to apply pressure to parts of the shoes opposite the normally unsupported portions so that when the toggle action is effective to cause outward pressure upon the inside of the shoes, such pressure will be effective to force the shoes into greater conformity with the band thus increasing the frictional surface between the shoe and the band: the purpose of which is to equalize the pressure throughout practically all portions of the wall.

The faces 31 of the posts 11 serve as stops to prevent the toggle bars 19 from passing radial position so that when relative rotation occurs between the elements 1 and 2 the first effect is to tighten the shoes to the extent determined by the floating adjusting block 15 thus producing the desired frictional resistance to such rotation and this resistance remains constant until reverse movement of the spring 4. The opposite faces 32 of said posts limit the releasing movement of the toggle bars.

In Fig. 1 the parts are shown in the released position that is caused by the compression of the spring 4; and upon recoil of the spring, the arm 6 will be drawn down-ward causing the ring 2 to rotate anti-clockwise, thus frictionally dragging the floating band and the brake shoes in the same direction and causing the brake shoes to move the toggle bars into radial position to expand the wear-ring 23, thus to exert maximum retarding effect previously determined by the adjustment of the adjusting screw 29. It is seen that, owing to the expansibility of the wear-ring 23, flexure of the brake shoes 21 will gradually bring more and more of the outer faces of the shoes against the wear-ring so as to gradually expand the wear-ring into closer and closer frictional relation to the wall 22 and gradually increase the friction from zero to maximum, thus avoiding too sudden clutching action and insuring perfect ease of action in absorbing shocks. The shoes are at all times held in frictional relation to the floating band; and said band is at all times in frictional relation with the circular wall 22.

I have discovered that in operation the floating band travels sufficiently relative to the ring and the shoes to equalize the wear and thus maintain a practically uniform retarding action. Preferably the shoes are of different normal radius than, and do not normally conform to the frictional lining of the wall and there are formed between the contact points 33 of the shoes, intermediate grease or oil chambers 34 between the shoes and the wear ring 23 when the device is in a releasing position.

As the resilient shoes return to normal form there occurs a tendency to suction that causes a flow of lubricant into the space between the shoe and the friction band; and as the shoe is forced toward conformity with the band the lubricant is forced by the shoe through the perforations 25 of the band and into the space between the band and the wall 22.

The blocks or posts 11 may be cast in skeleton form as shown, for lightness and to provide increased oil space. The spiral or diagonal cleft 24 of the floating band enables the shoes to ride over the cleft with a practically smooth and unobstructed action, but at the same time tends to effect a sufficient unbalancing of the forces acting on the band to assist in causing the band to creep around relative to the circular wall and the shoes, and to thus prevent the shoes from making pits or uneven places in the wall.

I claim:—

1. In a shock absorber the combination with a rotatably mounted circular wall; of a loose floating expansible band inside the wall; a shoe inside the band and means operatable by rotation of said circular wall to force the shoe against the band to effect frictional action between the shoe and the band and between the band and the wall.

2. In a shock absorber the combination with a rotatably mounted circular wall; of a loose floating open expansible band inside the wall; a shoe inside the band and means operatable by rotation of said circular wall to force the shoe against the band to effect frictional action between the shoe and the band and between the band and the wall.

3. In a shock absorber the combination with a rotatably mounted circular wall; of a loose floating expansible band inside the wall; a resilient shoe inside the band; and means operatable by rotation of said circular wall to force the shoe against the band to effect frictional action between the shoe and the band and between the band and the wall.

4. The combination with a circular ring wall; of a resilient shoe having inside the wall a segmental frictional surface; a floating open expansible band practically fitting the inside of the wall and surrounding the shoe, and having in contact with the frictional surface of the shoe an inner circular frictional surface to which the frictional surface of the shoe is normally unconformed; and means operable to deflect the shoe toward conformity with said inner frictional surface.

5. In a shock absorber the combination with a circular ring wall; of a shoe; a floating open expansible band between the shoe and the wall; said shoe and band having adjacent frictional faces that are normally unconformed to each other; and means to cause a relative change of shape between the frictional faces of the shoe and band thereby to increase the contacting frictional area between the shoe and the band.

6. In a shock absorber the combination with a circular ring wall; of a shoe; a floating open expansible band between the shoe and the wall; said shoe and band having adjacent frictional faces that are normally unconformed to each other; and means to deflect the shoe to cause the adjacent frictional faces of the shoe and band to more nearly conform to each other.

7. In a shock absorber the combination with a circular ring wall; of an open floating expansible band practically fitting the inside of the wall and having an internal annular frictional surface; a shoe having a frictional surface inside of, adjacent to, and of different normal radius than the internal frictional surface of the band; and means to apply force to the shoe to deflect its frictional surface toward conformity with the frictional surface of the floating band.

8. A shock absorber comprising a circular wall, a flexible shoe having a curved face normally unconformed to the wall, an expansible wear-ring between the shoe and the wall, and means to cause flexure of the shoe to bring more and more of its curved face against the wear-ring to gradually expand the wear-ring into closer and closer frictional relation to the wall.

In testimony whereof, I have hereunto set my hand at Los Angeles, California, January, 1912.

GEO. CUSHING MARTIN.

In presence of—
 JAMES R. TOWNSEND,
 L. BELLE RICE.

Copies of this patent may be obtained for five cents each, by addressing the "Commissioner of Patents, Washington, D. C."